United States Patent [19]

Rockwood

[11] Patent Number: 5,553,867
[45] Date of Patent: Sep. 10, 1996

[54] TRIPLE CARTRIDGE SEAL HAVING ONE INBOARD AND TWO CONCENTRIC SEALS FOR CHEMICAL PROCESSING PUMP

[75] Inventor: Robert E. Rockwood, Windham, N.H.

[73] Assignee: Environamics Corporation, Hudson, N.H.

[21] Appl. No.: 426,783

[22] Filed: Apr. 21, 1995

[51] Int. Cl.⁶ ........................................ F16J 15/34
[52] U.S. Cl. ............................ 277/15; 277/59; 277/65; 277/67
[58] Field of Search ..................... 277/15, 17, 22, 277/59, 65, 67, 72 R, 134; 415/111, 112, 175, 180, 230

[56] References Cited

U.S. PATENT DOCUMENTS

| | | |
|---|---|---|
| 2,005,429 | 6/1935 | Lichenstein . |
| 2,903,970 | 9/1959 | Elovitz et al. . |
| 2,984,505 | 5/1961 | Andresen et al. . |
| 3,091,469 | 5/1963 | Matt . |
| 3,115,097 | 12/1963 | Zagar et al. . |
| 3,122,375 | 2/1964 | Greenwald . |
| 3,477,729 | 11/1969 | Hershey ................... 277/22 |
| 3,515,497 | 6/1970 | Studebaker et al. . |
| 3,591,188 | 7/1971 | Eisner ...................... 277/15 |
| 3,909,012 | 9/1975 | Denis ....................... 277/15 |
| 4,268,232 | 5/1981 | Haupt ...................... 277/65 |
| 4,439,096 | 3/1984 | Rockwood et al. . |
| 4,466,619 | 8/1984 | Adams ..................... 277/65 |
| 4,560,173 | 12/1985 | Adams et al. ............ 277/65 |
| 4,613,141 | 9/1986 | Heinen . |
| 4,688,806 | 8/1987 | Heilala . |
| 4,708,711 | 11/1987 | Scherer ..................... 277/65 |
| 4,900,039 | 2/1990 | Klecker et al. . |
| 5,011,166 | 4/1991 | Watts . |
| 5,217,234 | 6/1993 | Hornsby ................... 277/65 |
| 5,249,812 | 10/1993 | Volden et. al. ........... 277/15 |
| 5,261,676 | 11/1993 | Rockwood . |
| 5,340,273 | 8/1994 | Rockwood . |
| 5,421,593 | 6/1995 | Aritsubo et al. ......... 277/65 |

FOREIGN PATENT DOCUMENTS

| | | |
|---|---|---|
| 344532 | 12/1989 | European Pat. Off. ........... 277/15 |
| 2822499 | 11/1978 | Germany . |
| 616994 | 4/1980 | Switzerland ................. 277/15 |
| 622325 | 3/1981 | Switzerland ................. 277/15 |

*Primary Examiner*—Scott W. Cummings
*Attorney, Agent, or Firm*—Myers, Liniak, and Berenato

[57] ABSTRACT

A chemical processing centrifugal pump is provided with a triple cartridge seal arrangement including a single inboard seal and a pair of concentric seals located rearward (i.e. outboard) of the inboard seal, the concentric seals being closest to the pump bearings for stability against vibration purposes. The passageway along the pump shaft between the inboard seal and the radially inwardmost concentric seal is filled with a pressurized barrier inert gas so as to create a gas seal while a barrier chamber defined between the concentric seals is filled with a pressurized barrier liquid. Accordingly, the concentric seals are lubricated by the barrier liquid disposed in the barrier chamber while the inboard seal is lubricated by the fluid being pumped. Optionally, the inboard seal may be lubricated by barrier liquid if such a pressurized liquid is used instead of the inert gas to fill the passageway.

9 Claims, 5 Drawing Sheets

TRIPLE CARTRIDGE SEAL HAVING ONE INBOARD AND TWO CONCENTRIC SEALS FOR CHEMICAL PROCESSING PUMP

This invention relates to a seal arrangement for a pump. More particularly, this invention relates to a triple cartridge seal arrangement for a chemical processing pump, the arrangement including a single inboard seal lubricated by the fluid being pumped (or by a barrier liquid) and a pair of concentric seals to be lubricated by a barrier fluid disposed therebetween.

BACKGROUND OF THE INVENTION

Environmentally hazardous fluids such as acids, oils, and toxins which can cause serious harm to the environment often need to be pumped through fluid flow systems from one location to another. When pumping such dangerous fluid materials, it is important that neither the liquid nor the gases which are often released by the liquid being pumped escape into the surrounding atmosphere or pump areas outside of the desired fluid pumping path.

Heretofore, conventional mechanical seals have been developed in order to overcome rotating pump shaft sealing problems. Such prior art mechanical seals allow for a fairly secure seal along the pump shaft against the fluids being pumped so as to prevent them from leaking or escaping axially rearward along the shaft. Yet, in some cases, the hazardous fluids being pumped penetrate the seals when the pressure within the pump becomes too high for the seals to handle or by other failure modes thereby allowing the fluid to escape into the surrounding environment and/or rearwardly along the pump shaft toward the pump motor area.

Double seal arrangements, including a barrier fluid disposed therebetween, are known in the art. In such arrangements, two seals form a cavity which is filled with a clean or environmentally safe barrier fluid. The seal facing the excess hazardous liquid being pumped inhibits movement of the pumped liquids sufficiently to prevent penetration of the seal by the liquid. Vapor produced by the liquid which permeates the first seal is stopped by the barrier fluid located in the barrier chamber defined between the seals. Unfortunately, if the first of these two seals breaks, the barrier fluid is permitted to escape from the barrier chamber, in effect, leaving the second seal without lubrication and quickly effecting failure of that second seal and allowing the harmful gases and liquid to penetrate the second seal and reach the surrounding environment. Furthermore, if the second seal fails first, the barrier liquid will be lost to atmosphere and the same end result is effected. If the first seal fails, the harmful liquid often easily penetrates the second seal thereby creating both hazardous gas and liquid leakage.

FIG. 1(a) is a cross-sectional side elevational view of a typical prior art chemical processing pump 1. Pump 1 includes casing 3, impeller 5, rotating pump shaft 6, annular stationary member 9, inboard ball bearings 11, outboard ball bearings 13, annular seal gland 15, pump frame 17, outboard bearing locknut 19, annular outboard bearing cover 21, pump shaft key coupling 23, seal 25, seal 27, seal 29, adapter 31, and mounting member 33. Pump 1 in FIG. 1(a) is shown in an inverted position for consistency of viewing.

Pump 1 also includes a motor (not shown) affixed to shaft 6 by way of key coupling 23. The motor functions to drive shaft 6 thereby rotating impeller 5 so as to pump fluid between inlet 35 and outlet 37 thereby defining a centrifugal pump.

FIG. 1(b) is a side elevational view of another prior art chemical processing pump, this view illustrating a partial section of the pump when cut in half. This pump includes impeller 5 for pumping fluid between fluid inlet 35 and fluid outlet 37. Also disclosed are inboard bearings 11, outboard pump shaft bearings 13, heavy duty rotatable pump shaft 6 for driving impeller 5, interchangeable bearing cartridge 4, stainless steel shaft sleeve 8 surrounding pump shaft 6, packing or mechanical seal 27, two piece packing gland 26, and support 33. This particular drawing is a typical section of a Worthington D line ANSI centrifugal pump.

Gland 26 and seal arrangement 27 of the FIG. 1(b) pump located adjacent member 9 are often not strong or effective enough to prevent the fluid being pumped from leaking rearward along shaft 6 from impeller 5 and reaching the rear pump areas or surrounding atmosphere.

Heretofore, the sealing arrangements used in area 36 of conventional chemical processing pumps have been inadequate for the aforesaid reasons as well as those discussed below. Typically, a pair of annular mechanical seals are disposed along shaft 6 in area 36 between inboard bearing 11 and impeller 5. Unfortunately, many operating conditions and liquid characteristics have been found to cause prior art sealing arrangements to prematurely break down thereby causing leakage of the fluid (liquid and/or gas) being pumped into the surrounding environment.

It is apparent from the above that there exists a need in the art for a seal arrangement for a pump which is less sensitive to surrounding changes in temperature and pressure as well as both fluid and operating conditions thereby creating a more environmentally safe pump. It is preferred that such a seal arrangement be simple, economical, and environmentally safe.

U.S. Pat. Nos. 5,261,676 and 5,340,273, commonly assigned, disclose an environmentally leakproof pump which is prior art to the instant invention due to offers of sale more than one year before the instant filing date. While these patents disclose an excellent high performance pump and corresponding seal arrangement, the particular details of these prior art pumps are not felt to be material to the instant invention. Additionally, commonly owned U.S. Ser. Nos. 08/200,012 (filed Feb. 22, 1994) and 08/214,288 (filed Mar. 17, 1994) are related to the instant invention in that they disclose pump sealing systems including barrier fluid circulation systems.

It is the purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a seal arrangement adapted to be positioned along a rotating shaft, the seal arrangement comprising:

first, second, and third annular sealing assemblies, each including a rotating and stationary annular sealing member for defining a fluid seal therebetween;

the second and third sealing assemblies being concentric with one another and the first sealing assembly being axially spaced from the second and third sealing assemblies, the first sealing assembly being located inboard of the second and third sealing assemblies;

a first annular barrier chamber adapted to be filled with a barrier fluid defined radially between the second and third sealing assembly; and a second annular barrier chamber adapted to be filled with a barrier fluid defined between and in communication with the first and second sealing assemblies.

In certain preferred embodiments of this invention, the first barrier chamber is to be filled with a barrier liquid and the second barrier chamber is to be filled with a barrier inert gas so that the first sealing assembly is lubricated by fluid being sealed against and the second and third sealing assemblies are lubricated by the barrier liquid in the first barrier chamber.

This invention further fulfills the above-described needs in the art by providing a centrifugal chemical processing pump adapted to pump a fluid, the pump comprising:

an impeller for pumping the fluid to be pumped;

an elongated shaft for rotatingly driving the impeller;

inboard and outboard bearing members for rotatingly supporting the shaft, the inboard bearing member being closest to the impeller;

a seal arrangement disposed between the bearing members and the impeller, the seal arrangement including an annular inboard seal assembly and a pair of concentric annular seal assemblies, the inboard seal assembly being located along the shaft between the impeller and the concentric seal assemblies;

a stationary annular member disposed along the shaft so as to circumferentially surround the inboard seal assembly, the stationary annular member being disposed axially between the impeller and the concentric seal assemblies; and wherein a narrow annular passageway is defined radially between the radially inner surface of the stationary annular member and the radially outer side of the inboard seal assembly so that the inboard seal assembly prevents fluid being pumped which enters the narrow annular passageway from reaching the concentric seal assemblies.

This invention further fulfills the above-described needs in the art by providing an environmentally safe seal arrangement adapted to be positioned in a chemical process pump having a central shaft for driving a fluid pumping member, the seal arrangement comprising:

first, second, and third annular sealing assemblies adapted to be positioned in the pump so as to surround the shaft, the second and third sealing assemblies being concentric and to be axially spaced along the shaft from the first sealing assembly;

the first sealing assembly including a first annular rotating sealing member adapted to be affixed to the shaft for rotation therewith, and a first stationary annular sealing member positioned adjacent the first rotating sealing member so as to provide a fluid seal therebetween;

the second sealing assembly including a second annular sealing member adapted to be affixed to the shaft for rotation therewith, and a second stationary annular sealing member positioned adjacent the second rotating sealing member so as to provide a fluid seal therebetween;

the third sealing assembly including a third annular rotating sealing member adapted to be affixed to the shaft for rotation therewith, and a third stationary annular sealing member positioned adjacent the third rotating sealing member so as to provide a fluid seal therebetween; and a first fluid passageway disposed between and in communication with the inner diametric side of the first sealing assembly in the inner diametric side of the second sealing assembly, the first passageway adapted to be filled with a barrier fluid which acts to prevent the pump fluid from reaching the second sealing assembly.

IN THE DRAWINGS

Figure 1A:
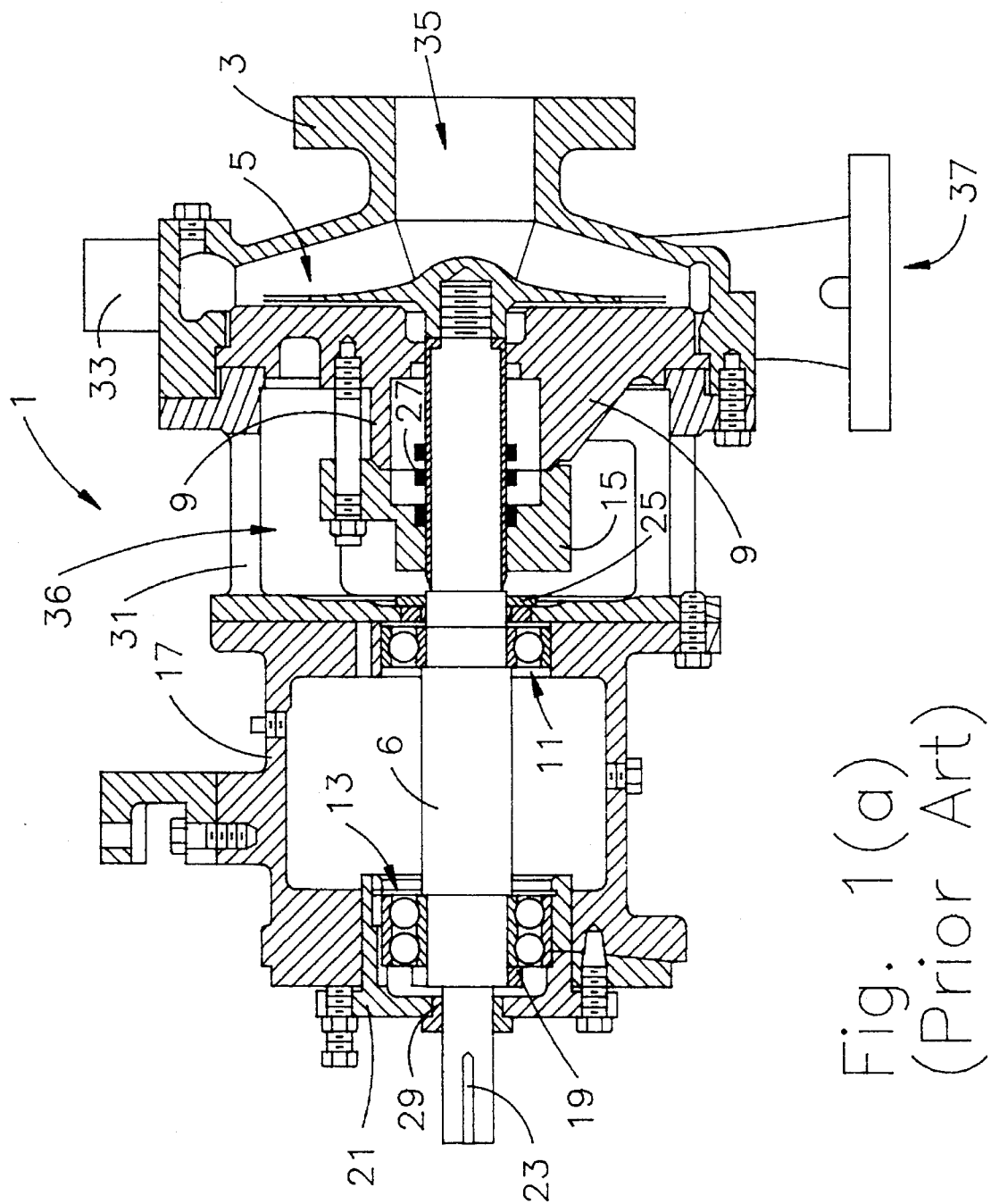
FIG. 1(a) is a partial side elevational cross-sectional view of a prior art pump, the pump being illustrated in an inverted manner for purposes of consistency of parts.
Figure 1B:
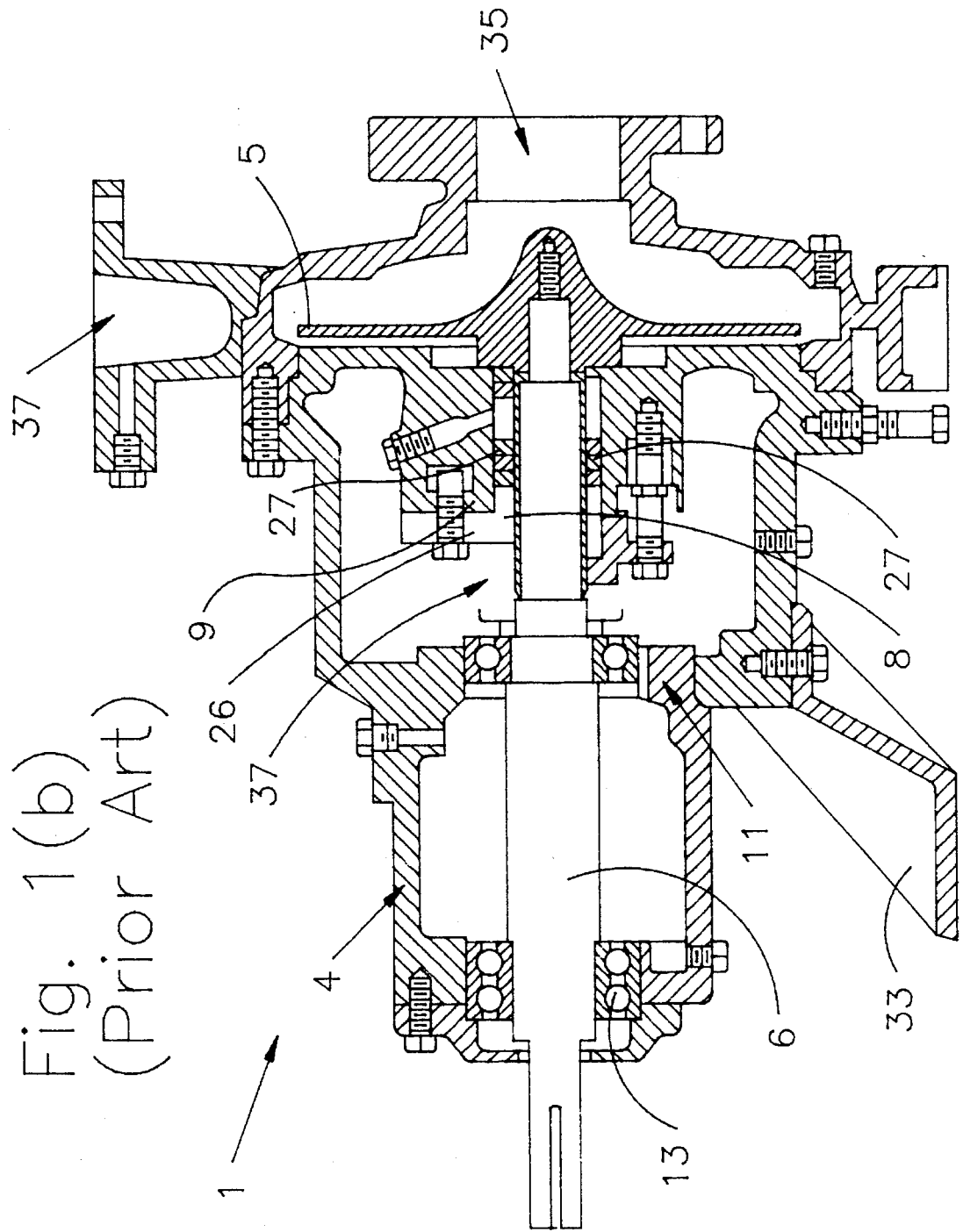
FIG. 1(b) is a partial side elevational view of a prior art pump cut in half.
Figure 2:
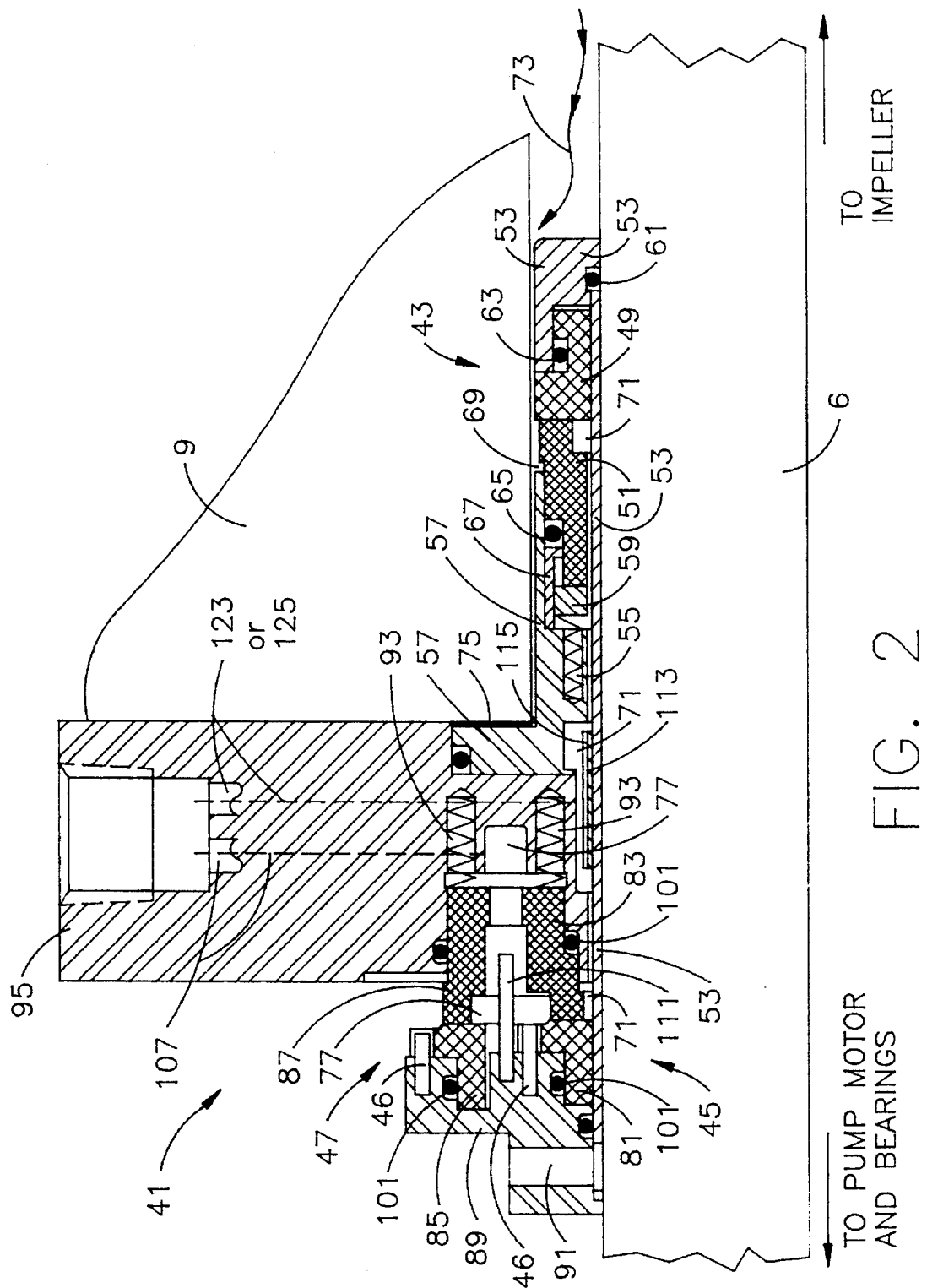

FIG. 2 is a partial side elevational cross-sectional view of a sealing arrangement according to an embodiment of this invention which may be positioned in the pumps of FIGS. 1(a) and 1(b), FIG. 2 illustrating only a partial section of the pump shaft and only the sealing arrangement on a single side (i.e. upper) of the shaft when in reality the sealing arrangement is annular in nature and circumferentially surrounds the pump shaft.

Figure 3:
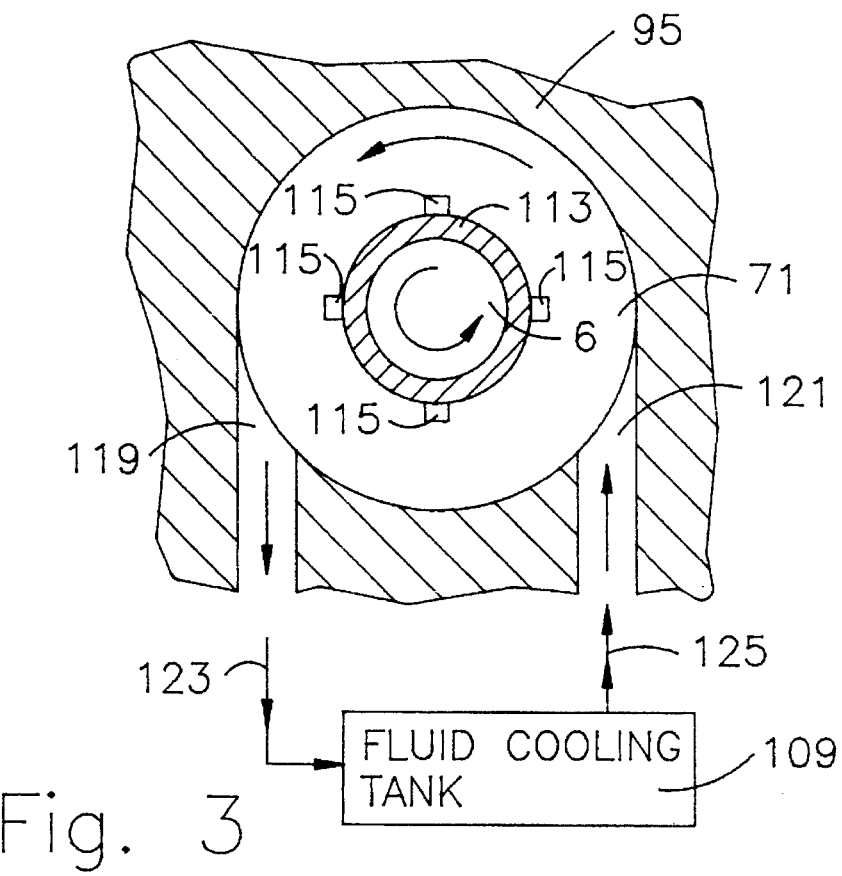

FIG. 3 is a rear elevational cross-sectional view of the pumping sleeve and surrounding area of the FIG. 2 embodiment.

Figure 4:
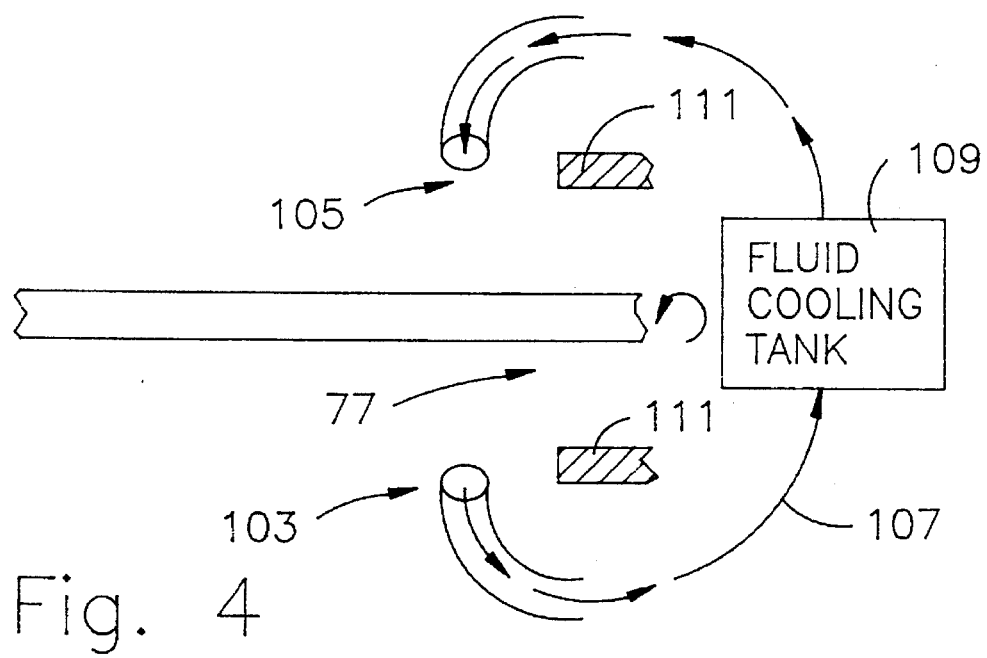

FIG. 4 is a schematic rear diagram of the barrier liquid circulation system provided within the barrier chamber disposed between the concentric seals of FIG. 2.

Figure 5:
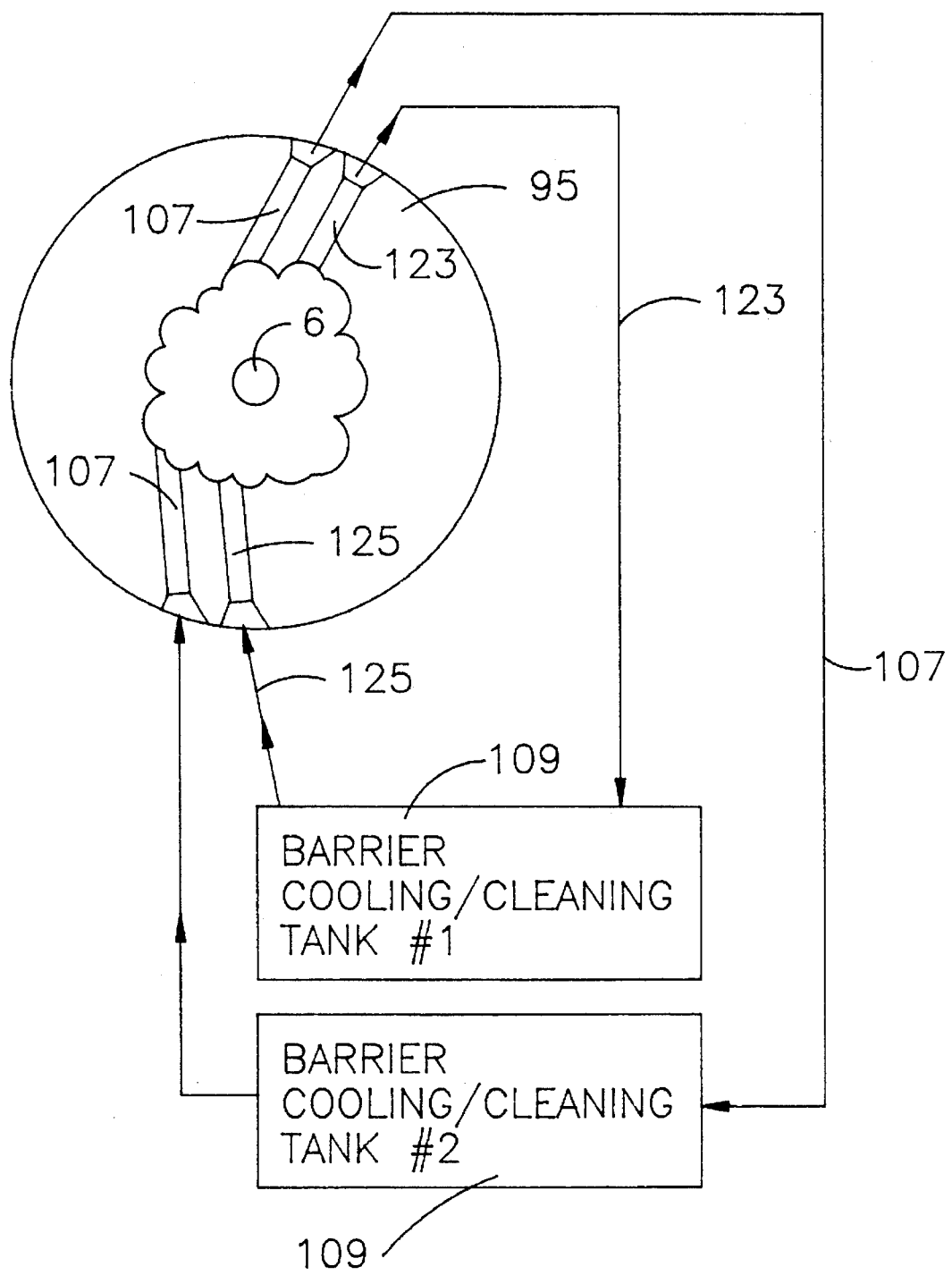

FIG. 5 is a rear elevational cross-sectional view of the pump gland of FIG. 2 illustrating its numerous fluid passageways or channels along with a schematic diagram of the fluid flow processes of the circulation systems of the FIG. 2 embodiment.

DETAILED DESCRIPTION OF CERTAIN EMBODIMENTS OF THIS INVENTION

Referring now more particularly to the accompanying drawings in which like reference numerals indicate like parts throughout the several views.

FIG. 2 is a side elevational partial cross-sectional view of a triple cartridge seal arrangement according to an embodiment of this invention, this seal arrangement being adapted to be positioned within a chemical processing centrifugal pump such as the ones illustrated in prior art FIGS. 1(a) and 1(b). The seal arrangement of the various embodiments of this invention are adapted to replace seals 27 in prior art pumps 1. The triple cartridge seal arrangements according to different embodiments of this invention are also adapted to fit into, for example, centrifugal pumps of the Goulds 3196 ANSI pump line; Durion ANSI centrifugal Mark II and Mark III model pumps; and Worthington D Line ANSI centrifugal pumps. The triplex cartridge seal arrangements of this invention may also be utilized within non-ANSI centrifugal pumps according to the particular application desired. The above-listed exemplary ANSI and non-ANSI pump lines each have a plurality of different sized pumps. Accordingly, the triple cartridge seal arrangements of the different embodiments of this invention may vary in size depending upon at least the pump shaft diameter of the pump into which the seal arrangement is being placed. Alternatively, seal arrangement 41 may be utilized in other conventional rotating equipment or devices having rotating shafts, such equipment including but not limited to mixers, agitators, and compressors.

It will be understood by those of ordinary skill in the art that FIG. 2 illustrates only the top half of the pump shaft and surrounding triple cartridge seal arrangement, the lower half of the shaft and seal arrangement not being shown in this figure for purposes of simplicity.

Triple cartridge seal arrangement 41 is annular in design so as to circumferentially surround rotating pump shaft 6. Triple cartridge seal arrangement 41 includes inboard seal assembly 43 and a pair of concentric (second and third) seal assemblies 45 and 47 respectively. Annular seal assembly 47 is disposed radially outward of seal assembly 45 so that seal assembly 45 is located radially between pump shaft 6 and annular seal assembly 47. The concentric seals assemblies are positioned closest to the pump shaft bearings so as to be the most resistant to vibration caused by rotation of shaft 6. Concentric seal assemblies 45 and 47 are spaced axially along pump shaft 6 from inboard seal assembly 43, with inboard seal assembly 43 being disposed axially between the concentric seal assemblies and impeller 5 of the pump into which triple cartridge seal arrangement 41 is to be placed.

Inboard seal assembly 43 includes annular rotating sealing member 49 and annular stationary sealing member 51, both of which circumferentially surround pump shaft 6 when arrangement 41 is positioned inside of pump 1. Rotating sealing member 49 along with annular sleeve 53 are affixed to pump shaft 6 for rotation therewith. As sealing member 49 rotates with pump shaft 6, a sealing interface is created between the respective abutting sealing faces of stationary sealing member 51 and rotating sealing member 49.

Rotating sealing member 49 may be made of, for example, silicon carbide while stationary sealing member 51 may be made of, for example, carbon. An exemplary carbon of which member 51 may be made is premium grade 658RC available from Pure Carbon Company, St. Mary's, Pennsylvania.

During rotation of pump shaft 6, stationary annular sealing member 51 is urged into sealing interface with member 49 by coil spring 55. Coil spring 55 is mounted inside of a cavity defined within annular L-shaped member 57. A plurality of such springs 55 are disposed circumferentially around pump shaft 6 inside of a corresponding number of cavities defined in L-shaped member 57 so that annular sealing member 51 is urged by a plurality of circumferentially spaced springs 55 into sealing contact with the sealing face of rotating sealing member 49.

Annular block 59 surrounds pump shaft 6 and is provided between springs 55 and the axially rear surface of stationary sealing member 51 for the purpose of concentrating the biasing force of springs 55 onto sealing member 51. Annular block 59 is advantageous in certain embodiments because the diameter of springs 55 is larger than the corresponding axially rear surface of sealing member 51. Thus, annular block 59 allows springs 55 to concentrate their biasing force evenly onto the axially rear surface of sealing member 51 thereby forcing it into sealing contact with rotating member 49.

O-ring 61 is provided so as to create a fluid seal for preventing the fluid being pumped from leaking under sleeve 53 and lodging in between shaft 6 and sleeve 53. O-rings 63 and 65 are provided radially exterior the outer surfaces of sealing members 49 and 51 respectively for the purpose of double balancing inboard seal assembly 43. Thus, seal assembly 43 remains effective in a sealing manner no matter what the pressure distribution on the different sides of the seal. In other words, seal assembly 43 remains effective whether the pressure is highest on the impeller side of the sealing interface between members 49 and 51 or on the motor side of the sealing interface.

Annular sealing member 49, which rotates with pump shaft 6, is substantially U-shaped as illustrated in FIG. 2 with O-ring 63 being disposed around its exterior periphery in the notch created by the U-shape. Additionally, the exterior periphery of sealing member 49 is supported by the portion of sleeve 53 located adjacent O-ring 63, while the interior diametric periphery of rotating sealing member 49 is supported by the elongated portion of sleeve 53 located adjacent pump shaft 6.

O-ring 65 is disposed around the exterior diametric periphery of stationary three-level sealing member 51 and is held in place by both annular L-shaped member 57 and annular member 67. Annular member 67 is disposed radially between L-shaped member 57 and annular block 59 for the purpose of locating O-ring 65 in an axially stabilized position around the exterior periphery of stationary seal member 51. Annular member 67 remains stationary as spring 55 and block 59 bias member 51 into sealing contact with rotating member 49.

The sealing interface between members 49 and 51 creates a fluid seal between narrow annular passageway 69 disposed adjacent the radially exterior periphery of sealing assembly 43 and fluid passageway 71 disposed adjacent the inner radial periphery of sealing assembly 43. Thus, when the fluid being pumped travels axially rearward along pump shaft 6 as illustrated by arrows 73, the fluid being pumped makes its way into passageway 69 adjacent the radially outer periphery of sealing assembly 43. The rotating seal created by sealing members 49 and 51 seals the fluid being pumped and prevents it from making its way into passageway 71 and beyond. Accordingly, the fluid being pumped which leaks into passageway 69 remains there due to the seal.

Annular radially extending seal or gasket 75 is located at the axially rearward end of passageway 69 between stationary annular member 9 and the radially protruding section of L-shaped member 57. Rubber or fiber gasket 75 keeps the fluid being pumped disposed within passageway 69 and prevents it from leaking therebeyond. Exemplary materials for seal or gasket 75 include rubber and Garlock fiber grade 3700.

Elongated barrier passageway 71 is disposed along pump shaft 6 and is located between and is in communication with the radially interior peripheries of seal assemblies 43 and 45. Passageway 71 is adapted to be filled with a barrier fluid (liquid or gas) such as water or an inert gas. The filling of passageway 71 with an inert gas creates a substantially full gas seal. In other words, by filling the area (i.e. 71) between seal assemblies 45 and 43 with a high pressure inert gas for example, sealing assembly 43 is lubricated by the liquid being pumped located in passageway 69 while sealing assemblies 45 and 47 are lubricated by a barrier liquid disposed within and substantially filling barrier chamber 77.

Barrier chamber 77 is annular and is located radially between concentric sealing assemblies 45 and 47. Thus, triple cartridge seal arrangement 41 defines a gas seal which is handled by liquid lubricated seal faces on both sides of the gas. This virtually eliminates any gas leakage from passageway 71 because the liquids in passageway 69 and chamber 77 act as barriers to prevent the inert gas from leaking out of passageway 71 via seal assemblies 43 and 45. Furthermore, the pressurized inert gas (e.g. air or nitrogen) in elongated passageway 71 acts as a barrier between the fluid being pumped located in passageway 69 and the outside atmosphere or the barrier liquid in chamber 77. This significantly reduces the possibility of contamination to the pumped fluid and substantially reduces the chance of the pumped fluid leaking through sealing assembly 43 and getting into the barrier fluids in chambers 71 and 77 or the outside environment. Thus, the result is a substantially zero-leakage triple cartridge seal arrangement 41.

Seal assembly 45 includes rotating annular sealing member 81 and stationary annular sealing member 83 while sealing assembly 47 includes rotating annular sealing member 85 and stationary annular sealing member 87. Sealing members 83 and 87 may be made of, for example, grade 658RC carbon available from Pure Carbon Company or any other conventional material while rotating sealing members 81 and 85 may be made, for example, silicon carbide or any other conventional material.

Annular sealing members 81 and 85 are affixed to annular support member 89 which is in turn affixed to shaft 6 by way of a bolt(s) or set screws (not shown) to be inserted within aperture(s) 91. Thus, sealing members 81 and 85 rotate along with pump shaft 6 when driven by the pump motor so as to create a sealing interface between the sealing or abutting surfaces of the stationary and rotating sealing members of assemblies 45 and 47 respectively. Stationary sealing members 83 and 87 are urged or biased into sealing contact with rotating sealing members 81 and 85 respectively by coil springs 93. Coil springs 93 are disposed in housing areas defined within seal gland 95. Springs 93 are stationary relative to their surrounding housings except for their biasing function directed at the stationary sealing members. Seal gland 95 is annular in design so as to surround pump shaft 6 and includes defined therein a plurality of spring apertures so that a plurality of springs 93 may be located around pump shaft 6 for the purpose of biasing or urging annular sealing members 83 and 87 into sealing contact with the respective rotating sealing members. Anti-rotation pins 46 disposed in annular member 89 prevent rotating seal members 81 and 85 from rotating relative to member 89 during shaft 6 rotation. Anti-rotation pins 46 are located in slots cut in the outer diameters of members 81 and 85.

Sealing assemblies 45 and 47 are double balanced by way of O-rings 101. Thus, due to the double balancing, sealing assemblies 45 and 47 define effective seals regardless of whether the pressure is higher within chamber 77 or alternatively on the other side of the seals defined between the rotating and stationary members.

Annular barrier chamber 77 defined between assemblies 45 and 47 is adapted to be filled with a barrier liquid such as water for the purpose of lubricating seal assemblies 45 and 47 and creating more effective seals. It will be appreciated by those of skill in the art that the lubrication of rotating annular seals 43, 45, and 47 may originate from either the radially interior or radially exterior side of the seals.

The barrier liquid used to substantially fill barrier chamber 77 is circulated to and from chamber 77 by way of a fluid/liquid circulation system best illustrated in FIGS. 4 and 5. At least one approximately tangential liquid outlet aperture 103 (see FIG. 4) is defined in gland 95 within chamber 77 along with at least one approximately tangential fluid inlet aperture 105 and corresponding flow channel. Accordingly, the barrier liquid filling chamber 77 is forced therefrom by way of tangential outlet 103 and subsequently reenters chamber 77 by way of inlet 105. A fluid flow channel or passageway 107 is disposed remote from chamber 77 between outlet 103 and inlet 105, channel 107 allowing the barrier liquid leaving chamber 77 to enter liquid cooling/cleaning tank 109 and subsequently reenter chamber 77 via inlet 105 in a clean and cooled state. As a result, the barrier liquid within chamber 77 is maintained at an acceptable temperature and an acceptable cleanliness so as to keep sealing assemblies 45 and 47 clean and prevent their temperatures from undesirably fluctuating to too high of a level. Additionally, the circulation of the barrier liquid to and from chamber 77 keeps the concentric seal assembles free from the accumulation of dirt and/or solids.

A plurality of rotating pumping members 111 are disposed within chamber 77, these pumping members 111 surrounding shaft 6 and being spread throughout the chamber at predetermined circumferential intervals. In the FIG. 2 embodiment, pumping pins 111 are mounted to member 89 so as to rotate along with shaft 6 when driven by the pump motor. When rotated throughout chamber 77, pins 111 act to create a fluid flow around shaft 6 within the chamber. As a result of this flow caused by pumping pins 111, air bubbles are substantially eliminated and the barrier liquid within the chamber is caused to flow out of the chamber by way of outlet 103 and into tank 109 and subsequently back into chamber 77 by way of tangential inlet 105. The number of pins 111 affixed to member 89 around shaft 6 may be between about 2 and 12 (most preferably about 6–8) according to certain embodiments of this invention. These pins may be made, for example, of stainless steel. Alternatively, pumping paddles or fins may be used instead of pins 111.

After the barrier liquid leaves chamber 77 by way of outlet 103, it flows through channel or passageway 107 which is defined in gland 95 as shown in FIGS. 2 and 5. Then, after the liquid is cooled and/or cleaned in tank 109, it flows back into chamber 77 by way of a separate and independent channel 107 also defined in gland 95. The inlet and outlet channels 107 defined in gland 95 for chamber 77 are circumferentially spaced from one another as illustrated in FIG. 5.

Under some circumstances, it is desireable to fill elongated passageway or chamber 71 with a high pressure barrier liquid instead of a barrier inert gas. As a result of these instances, annular pumping sleeve 113 is disposed within passageway 71 and affixed to pump shaft 6 for rotation therewith. Pumping sleeve 113 is illustrated cross-sectionally in FIG. 3. Pumping sleeve 113 includes a plurality of circumferentially spaced fins or paddle members 115 disposed around its outer periphery. Thus, when shaft 6 rotates when driven by the pump motor, pumping sleeve 113 and fins 115 disposed thereon are rotated therewith within passageway 71 thereby creating a pumping motion imparted to the pressurized barrier liquid disposed within barrier passageway 71. When passageway 71 is filled with a barrier liquid, this pumping motion created by rotation of sleeve 113 forces the barrier liquid out of passageway 71 by way of tangential outlet port 119 (see FIG. 3). After leaving passageway 71, the barrier liquid makes its way into tank 109 (tank #1) and then back into passageway 71 by way of tangential fluid inlet 121. The pressure within barrier chambers 71 and 77 is maintained higher than that in passageway 69 and the surrounding atmosphere for sealing and lubrication purposes.

Separate tanks 109 are provided for chambers 71 and 77 according to preferred embodiments of this invention. Tank #1 corresponds to chamber 71 while tank #2 is for chamber 77.

After leaving passageway 71, the barrier liquid travels through outlet 119 and channel 123 defined in part in gland 95. After being cleaned and/or cooled in tank #1, the liquid reenters passageway 71 by way of fluid channel 125 also defined at least in part in gland 95. Channels 123 and 125 are defined in gland 95 in a circumferentially spaced manner as illustrated in FIG. 5, FIG. 5 being a cross-sectional rear view of gland 95. Additionally, channels 107 and 123/125 are axially spaced from one another in gland 95 as illustrated in FIG. 2 due to the fact that the tangential fluid inlets and outlets for chambers 71 and 77 are axially spaced from one another along shaft 6.

When barrier passageway 71 is filled with inert gas, the gas is inserted into passageway 71 by way of either channel 123 or 125 so as to maintain the inert gas at a predetermined pressure which is acceptable. For example, a gas line may be attached to the inlet port including a regulator with the outlet port being closed. In other words, when inert gas is used as a barrier in passageway 71, it is not circulated to and from the passageway as is the liquid. The pressure of the inert gas (e.g. air, nitrogen, etc.) in chamber 71 is, of course, maintained at a predetermined level (by the regulator) which is high enough to create the above-discussed gas seal.

Now described is a typical path taken by the fluid being pumped into the area occupied by seal arrangement 41. Typically, the fluid being pumped by the impeller often makes its way axially rearward along shaft 6 as illustrated by path 73. When the fluid being pumped reaches the axially forward radially extending surface of sleeve 53, it moves radially outward therearound and into passageway 69. The rearward axial movement of the fluid being pumped in passageway 69 is stopped by seal or gasket 75 thereby causing the fluid to fill up passageway 69.

Seal 43 defined by members 49 and 51 creates a sealing interface which prevents the fluid being pumped in 69 from entering elongated passageway 71 which is on the other side of the seal.

Passageway 71 is filled with an inert gas according to preferred embodiments of this invention, and optionally a barrier liquid according to certain other embodiments of this invention. The barrier inert gas acts to prevent the liquid being pumped in chamber 69 from entering chamber 71 due to the high pressure maintained in chamber 71. If by chance, however, the fluid being pumped present in passageway 69 gets by seal 43, it then will proceed axially rearward along shaft 6 through passageway 71 until it reaches the inner diametric face of seal 45. At this point, rotating seal 45 prevents the fluid from moving radially outward through seal 45 and reaching chamber 77. Because chamber 77 is preferably filled with a high pressure barrier liquid (and possibly an inert gas) the pumped fluid is further prohibited from breaking through seals 45 and 47 and reaching other areas of the pump and/or the surrounding atmosphere.

Unless discussed above, the above-described elements of the various embodiments of this invention are manufactured and connected to one another by conventional methods and materials commonly used throughout the art.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. An environmentally safe seal arrangement adapted to be positioned in a pump having a central rotatable shaft for driving a fluid pumping member, the seal arrangement comprising:

first, second, and third annular sealing assemblies adapted to be positioned in the pump so as to surround the shaft, said second and third sealing assemblies being concentric and axially spaced along the shaft from said first sealing assembly;

said first sealing assembly including a first annular rotating sealing member adapted to be affixed to the shaft for rotation therewith, and a first stationary annular sealing member positioned adjacent said first rotating sealing member so as to provide a fluid seal therebetween;

said second sealing assembly including a second annular rotating sealing member adapted to be affixed to the shaft for rotation therewith, and a second stationary annular sealing member positioned adjacent said second rotating sealing member so as to provide a fluid seal therebetween;

said third sealing assembly including a third annular rotating sealing member adapted to be affixed to the shaft for rotation therewith, and a third stationary annular sealing member positioned adjacent said third rotating sealing member so as to provide a fluid seal therebetween;

a first fluid passageway disposed between and in communication with the inner diametric side of said first sealing assembly and the inner diametric side of said second sealing assembly, said first passageway adapted to be filled with a barrier fluid which acts to prevent the pumped fluid from reaching said second sealing assembly;

an annular barrier chamber located radially between and in communication with said second and third sealing assemblies, said barrier chamber adapted to be filled with a barrier liquid which acts to lubricate said second and third sealing assemblies;

a barrier chamber circulation system for circulating said barrier liquid to and from said annular barrier chamber, said barrier chamber circulation system including a rotating pumping member located in said barrier chamber for forcing said barrier liquid out of said barrier chamber;

wherein said barrier chamber circulation system further comprises a barrier chamber outlet port and a barrier chamber inlet port arranged so that the barrier liquid is forced by said rotating pumping member out of said barrier chamber via said outlet port and reenters said barrier chamber via said inlet port; and a stationary annular gland adapted to surround the shaft, said gland having first, second, third, and fourth radially extending gland fluid passageways defined therein, said first gland fluid passageway being in fluid communication with said barrier chamber outlet port and said second gland fluid passageway being in fluid communication with said barrier chamber inlet port.

2. A seal arrangement adapted to be positioned along a rotating shaft, the seal arrangement comprising:

first, second, and third annular sealing assemblies, each including a rotating and stationary annular sealing member for defining a fluid seal therebetween;

said second and third sealing assemblies being concentric with one another and said first sealing assembly being axially spaced from said second and third sealing assemblies;

a first annular barrier chamber for being filled with a barrier fluid defined radially between said second and third sealing assemblies; and a second annular barrier chamber for being filled with a barrier fluid defined between and in communication with said first and second sealing assemblies; and pumping means located in one of said first and second barrier chambers for forcing the barrier fluid out of the chamber, said pumping means including a plurality of pumping pins surrounding the shaft and arranged substantially parallel to the shaft.

3. The seal arrangement of claim 2, wherein said plurality of pins are located in said first barrier chamber radially between said second and third sealing assemblies, and wherein said pins protrude axially outward from a rotating sealing flange which rotates together with the shaft whereby the number of air bubbles produced by said pumping means is reduced.

4. The seal arrangement of claim 2, wherein said first barrier chamber is filled with a barrier liquid and said second barrier chamber is filled with a barrier inert gas so that said first sealing assembly is lubricated by fluid being sealed against and said second and third sealing assemblies are lubricated by the barrier liquid in said first barrier chamber.

5. A seal arrangement to be positioned along a rotating shaft, the seal arrangement comprising:

first, second, and third annular sealing assemblies, each including a rotating and stationary annular sealing member for defining a fluid seal therebetween;

said second and third sealing assemblies being concentric with one another and said first sealing assembly being axially spaced from said second and third sealing assemblies;

a first annular barrier chamber to be filled with a first barrier fluid disposed radially between and in communication with said second and third sealing assemblies; and a second annular barrier chamber to be filled with a second barrier fluid defined between and in communication with said first and second sealing assemblies;

a gland extending radially from and surrounding the shaft, said gland including first means for inputting the first barrier fluid into said first barrier chamber and second means for inputting the second barrier fluid into said second barrier chamber.

6. The seal arrangement of claim 5, wherein said first means is for inputting a barrier liquid and said second means is for inputting a barrier gas under pressure so that said second and third sealing assemblies are lubricated by the barrier liquid and said first sealing assembly is lubricated by the fluid being sealed against.

7. The seal arrangement of claim 5, further comprising first and second different barrier tanks in communication with said gland and associated with said first and second barrier chambers respectively.

8. The seal arrangement of claim 5, wherein said second and third sealing assemblies each include a sealing member affixed to a flange for rotation with the shaft and a stationary sealing member, and wherein said sealing members are affixed to said flange by way of pins which prevent said sealing members from rotating relative to said flange.

9. A centrifugal pump including a motor and the seal arrangement of claim 5.

* * * * *